United States Patent [19]

Kitamura et al.

[11] Patent Number: 5,534,584
[45] Date of Patent: Jul. 9, 1996

[54] GLASS-REINFORCED THERMOPLASTIC RESIN COMPOSITIONS CONTAINING THE ANATASE FORM OF TITANIUM DIOXIDE AS A WHITE PIGMENTING AGENT

[75] Inventors: Hiroshi Kitamura; Masamichi Mitsuuchi, both of Shizuoka, Japan

[73] Assignee: Polyplastics Co., Ltd., Japan

[21] Appl. No.: 421,458

[22] Filed: Apr. 13, 1995

Related U.S. Application Data

[63] Continuation of Ser. No. 126,737, Sep. 27, 1993, abandoned, which is a continuation of Ser. No. 845,077, Mar. 3, 1992, abandoned.

[30] Foreign Application Priority Data

Mar. 4, 1991 [JP] Japan ................................. 3-037355

[51] Int. Cl.$^6$ ........................................... C08K 3/22
[52] U.S. Cl. ..................... 524/497; 524/449; 524/451; 523/216; 523/217; 523/220; 523/221; 523/223; 523/527
[58] Field of Search ................... 524/497, 449, 524/451; 523/216, 217, 220, 221, 223, 527

[56] References Cited

U.S. PATENT DOCUMENTS

| | | | |
|---|---|---|---|
| 3,663,499 | 5/1972 | Brinkmann | 524/497 |
| 4,073,764 | 2/1978 | Hemmerich et al. | 524/497 |
| 4,124,652 | 11/1978 | Quinn et al. | 524/449 |
| 4,125,572 | 11/1978 | Scott | 524/451 |
| 4,664,983 | 5/1987 | Nakamura et al. | 524/497 |
| 4,877,819 | 10/1989 | Kiyohara et al. | 524/497 |
| 5,102,935 | 4/1992 | Heinz et al. | 524/497 |
| 5,352,725 | 10/1994 | Palmer et al. | 524/497 |

FOREIGN PATENT DOCUMENTS

| | | | |
|---|---|---|---|
| 2650340 | 5/1978 | Germany | 524/497 |
| 0126848 | 5/1982 | Japan | 524/497 |
| 0225135 | 12/1983 | Japan | 524/497 |
| 2293842 | 12/1990 | Japan | 524/497 |

*Primary Examiner*—Paul R. Michl
*Assistant Examiner*—Alga Asinovsky
*Attorney, Agent, or Firm*—Nixon & Vanderhye

[57] ABSTRACT

Exceptional whiteness of glass-filled thermoplastic resin compositions is achieved by incorporating a white-pigmenting effective amount of the anatase form of titanium dioxide. The anatase form of titanium dioxide surprisingly improves the whiteness of glass-filled thermoplastic resin materials while also improving its physical properties (e.g., tensile strength and tensile elongation properties).

7 Claims, No Drawings

GLASS-REINFORCED THERMOPLASTIC RESIN COMPOSITIONS CONTAINING THE ANATASE FORM OF TITANIUM DIOXIDE AS A WHITE PIGMENTING AGENT

This is a continuation of parent application Ser. No. 08/126,737, filed Sep. 27, 1993, now abandoned, which in turn is a continuation of Ser. No. 07/845,077, filed Mar. 3, 1992, (both abandoned).

FIELD OF INVENTION

The present invention generally relates to thermoplastic resin compositions which include both a white pigment and a glass filler material. Preferred embodiments of the invention are directed to white-pigmented glass-filled thermoplastic resin compositions whereby the white pigment is a white pigmenting effective amount of the anatase form of titanium dioxide ($TiO_2$).

BACKGROUND AND SUMMARY OF THE INVENTION

Glass-reinforced thermoplastic engineering resins are known to exhibit excellent mechanical strength and tensile properties. As a consequence, glass-reinforced thermoplastic engineering resins are traditionally used to form various components in a number of end-use applications (e.g., parts for electrical and electronic apparatus, automotive parts, and the like).

Molded parts formed of such glass-reinforced thermoplastic engineering resins are sometimes visible and/or used for ornamental purposes. For these reasons, it may be desirable to impart a particular color characteristic to the resin by incorporating pigmenting agents. In this connection, a number of dyes and pigments have been used so as to impart desired color characteristics to resin compositions. However, it is typically necessary to use a white pigment, either alone so as to impart whiteness to the resin composition or conjointly with a non-white color pigment so as to impart a softer color tone and/or a desired opacity to the resin composition. In general, titanium oxide has been employed as a white pigmenting agent for such purposed in conventional thermoplastic resin compositions.

When titanium oxide is employed as a white pigmenting agent, for example, in glass-reinforced polyester resin compositions, its presence typically causes mechanical property deterioration (e.g., decreases in tensile elongation and/or impact shock resistance). In addition, molded articles formed of a resin which includes titanium oxide as a white pigmenting agent may not entirely be satisfactory in terms of appearance, color tone and/or whiteness. As a result, the end-use applications for such titanium oxide pigmented resins is considerably restricted.

Various inorganic materials, for example carbonates, sulfides and metal oxides other than titanium oxide, have been employed in an attempt to impart the desired whiteness to resin compositions. However, since most of these other inorganic materials which have been used as a white pigmenting agent possess a refractive index that is approximately the same as the resin, they generally do not impart the desired white opacity to the resin. For those inorganic materials which do exhibit a desirable whiteness effect, they typically must be added in greater amounts as compared to the amounts needed to obtain comparable whiteness when titanium oxide is used. Excessive use of such inorganic materials thus tends to exacerbate mechanical property deterioration, degrade the surface effects on molded parts and the like.

What has been needed in the art, therefore, are improvements regarding imparting white pigmentation to normally solid thermoplastic engineering resin compositions without deleteriously affecting their mechanical properties. It is towards providing such a need that the present invention is directed.

Broadly, the present invention resides in the discovery that satisfactory whiteness for thermoplastic engineering resins may be achieved by incorporating (blending) the anatase form of titanium dioxide (i.e., octahedrite) in a thermoplastic base resin. The effects of the present invention are especially evident when the base resin includes a glass reinforcement medium (e.g., glass fibers, beads, flakes, powders, etcetera).

In preferred forms, the present invention will be embodied in a thermoplastic resin composition having between 0.01 to 10 parts by weight of the anatase form of titanium dioxide which is blended with 100 parts by weight of a glass-reinforced thermoplastic resin composition. The glass-reinforced thermoplastic resin composition will itself be comprised of between about 35 to 95 parts by weight of a thermoplastic base resin (e.g., polyacetal, polyester, polycarbonate, polyphenylene sulfide and the like), and between about 5 to 65 parts by weight of a glass filler material as a reinforcement agent.

Further aspects and advantages of this invention will become more clear after careful consideration is given to the detailed description of the preferred exemplary embodiments thereof which follow.

DETAILED DESCRIPTION OF THE PREFERRED EXEMPLARY EMBODIMENTS

Various titanium oxides are typically obtained from ilmenite (i.e., titanium iron ore) and may be extracted using the well known sulfuric acid or chlorine extraction techniques. For example, when using the sulfuric acid extraction technique, the ore is first dissolved in sulfuric acid and is subjected to a number of down-stream processing steps including reduction, purification, settling, washing, surface treatment, calcination and pulverization.

Both the anatase and rutile forms of titanium dioxide can be obtained by nuclei formation and subsequent calcination. According to the present invention, however, only the anatase form of titanium dioxide has been discovered to not only impart a desired whiteness to the resin composition, but also does not adversely affect the resin composition's mechanical properties. That is, use of the rutile form of titanium dioxide surprisingly does not impart as high a degree of whiteness and strength compared to the use of the anatase form of titanium dioxide in resin compositions.

While not wishing to be bound to any particular theory, it is believed that during blending and/or injection molding of a glass-reinforced thermoplastic resin, the rutile form of titanium dioxide abrades not only the glass reinforcement material, but also the metal components of the apparatus with which it comes into contact. The glass reinforcement is physically deteriorated by virtue of the abrasive effects of the rutile form of titanium dioxide thereby reducing the resulting strength of the molded resin article. In addition, metal abrasion of the apparatus used to process the resin tends to impart an undesirable gray tone to the resin composition. To the contrary, when the anatase from of titanium dioxide is blended with a glass-reinforced resin composition, no "graying" of the composition can be discerned after processing. Instead, the resin compositions exit the processing apparatus (e.g., extruder) in a fine white form.

The reasons for this phenomenon are not fully understood at this time. However, it is surmised that since the rutile form of titanium dioxide has unit crystal cells which are relatively small and dense (thereby having a high specific gravity and hardness), it it significantly more abrasive as compared to the anatase form of titanium dioxide which has unit crystal cells which are less dense (and thus exhibit a lower specific gravity and hardness). In this connection, typical physical data for both the anatase and rutile forms of titanium dioxide are noted below in Table A:

TABLE A

|  | Anatase TiO2* | Rutile TiO2** |
| --- | --- | --- |
| Crystal System | Tetragonal | Tetragonal |
| Lattice constant a | 3.78 Å | 4.58 Å |
| Lattice constant c | 9.49 Å | 2.95 Å |
| Specific gravity (20° C.) | 3.9 | 4.2 |
| Hardness (old Mohs) | 5.5–6.0 | 6.0–7.0 |

Notes:
*Tipaque(™) A-100, Ishihara Sangyo Kaisha, Ltd.
**Tipaque(™) A-620, Ishihara Sangyo Kaisha, Ltd.

The preferred anatase form of titanium dioxide used in the compositions of this invention will have an average grain size of less than 1 μm, and more preferably within the range from 0.1 to 0.5 μm. The amount of the anatase form of titanium dioxide employed in the compositions of this invention is preferably between 0.01 to 10 parts by weight, and more preferably between 0.1 to 2 parts by weight based on 100 parts by weight of the glass-reinforced thermoplastic resin composition which includes a thermoplastic base resin and a glass filler material.

There is no particular restriction on the thermoplastic base resin that may be used in the compositions of the present invention. Thus, virtually any typical thermoplastic resin can be used, for example, crystalline thermoplastic resins such as polyethylenes, polypropylenes, polybutene-1, polymethylpentene-1, polyacetals, (including homopolymers, copolymers and the like), polyamides, fluororesins, polyphenylene sulfides and polyesters (e.g. polyethylene terephthalate, polypropylene terephthalate, polybutylene terephthalate, completely aromatic polyester and the like), and non-crystalline thermoplastic resins such as polyvinyl chlorides, polyvinylidene chlorides, polystyrenes, ABS resins, acryl resins, cellulose resins, polycarbonates, polyarylates, phenoxy resins, polyphenylene oxides, polysulfones, ionomers, styrene butadienes and thermoplastic elastomers. The base resins may be used as an admixture of several resins to attain desired effects.

Preferred thermoplastic resins which exhibit significant effects in terms of reduced discoloration and improved physical properties upon the addition of the anatase form of titanium dioxide include those resins mainly comprised of polypropylene, polyacetal, polyamide, fluororesin, polyester, polystyrene, acryl resin, polycarbonate and polyphenylene sulfide. Resins mainly comprised of polyacetal, polyester, polycarbonate and polyphenylene sulfide are particularly preferred.

Virtually any glass filler that is conventionally used as reinforcement media may be used in the compositions of the present invention. Thus, virtually any form of glass fibers, milled glass fibers (i.e., finaly divided glass particles obtained by grinding and milling glass fibers), glass beads, glass flakes and glass powders can be used, either alone or in combination. Preferably, however, the glass filler material will mainly be composed of glass fibers, glass beads and/or glass flakes.

It is sometimes desirable to use a binding agent with the glass filler material. Specific examples of such binding agents include functional compounds such as epoxy compounds, isocyanate compounds, silane compounds and titanate compounds. These compounds may be used by pre-application to the glass filler material, or alternatively may be added concurrently with the other components during preparation of the resin composition. If used, the binding agent will be present in amounts up to 10% by weight, and preferably between 0.05 to 5% by weight of the glass filler material.

The blending ratio of the thermoplastic base resin and the glass filler material used in the present invention is preferably between 5 to 65 parts by weight of the glass filler material to between 95 to 35 parts by weight of the base resin. Preferably, between 10 to 50 parts by weight of the glass filler material to 90 to 50 parts by weight of the base resin are employed. Greater amounts of the glass filler material can be used and provide remarkable whiteness and strength retention due to the presence of the anatase form of titanium dioxide.

If the glass filler material is employed in amounts less than 5 parts by weight, insufficient reinforcing effects and rigidity improvements are realized. Moreover, improvements due to the presence of the anatase type of titanium dioxide are not fully realized. On the other hand, if the glass filler material is used in amounts exceeding 65 parts by weight, the molding difficulties are experienced.

The compositions of the present invention may further be blended with known additives and agents generally used with thermoplastic engineering resins. For example, stabilizers such as antioxidants, heat stabilizers and ultraviolet absorbers, antistatic agents, flame retardants, non-white colorants such as dyes and pigments, lubricants, plasticizers, crystallization accelerators, and nucleating agents may be employed so as to impart desired properties to the resin composition in dependence upon its intended use.

The compositions of the present invention can easily be prepared using apparatus and techniques conventionally used to prepare engineering polyblend compositions generally. For example, the components may be mixed, and kneaded, with the mixture then being extruded by means of a screw extruder so as to prepare pellets. The pellets may thereafter by molded to form articles. Alternatively, pellets having different compositions may be premixed in preselected amounts to form a master blend which contains a relatively high proportion of $TiO_2$ which is thereafter molded with the balance of the base resin. Furthermore, at least one of the components may be fed directly into a suitable molding machine. The compositions may also be prepared by a technique whereby portions of the components are mixed in the form of a fine powder and then blended with the remaining portions of the components prior to extrusion and/or molding. This latter technique is especially preferred since the components are more homogeneously blended with one another.

As is apparent from the description above, the present invention is particularly effective to impart high whiteness to thermoplastic resin compositions without degrading the desired physical and/or mechanical properties due to the presence of the anatase form of titanium dioxide. The compositions of this invention therefore find particular utility as a material from which molded parts and component structures can be fabricated, for example, as parts in electrical or electronic applications, automotive parts (both interior and exterior), and other general industrial equipment.

The present invention will be described in greater detail by referring to the following non-limiting Examples.

Comparative Examples 1–5

Examples 1–5 were repeated, except that the rutile form of titanium dioxide was used instead of the anatase form of titanium dioxide. The results of evaluation are also reported in Table 1.

TABLE 1

| | | Example 1 | Comp. Example 1 | Example 2 | Comp. Example 2 | Example 3 | Comp. Example 3 | Example 4 | Comp. Example 4 | Example 5 | Comp. Example 5 |
|---|---|---|---|---|---|---|---|---|---|---|---|
| Composition (pbw) | | | | | | | | | | | |
| (A) | | | | | | | | | | | |
| Polybutylene terephthalate resin | | 70 | 70 | 85 | 85 | 75 | 75 | — | — | — | — |
| Polyacetal resin | | — | — | — | — | — | — | 75 | 75 | — | — |
| Polycarbonate resin | | — | — | — | — | — | — | — | — | 70 | 70 |
| (B) | | | | | | | | | | | |
| Glass fiber | | 30 | 30 | 15 | 15 | — | — | 25 | 25 | 30 | 30 |
| Glass beads | | — | — | — | — | 25 | 25 | — | — | — | — |
| (C) | | | | | | | | | | | |
| Anatase type | | 2 | — | 2 | — | 2 | — | 0.5 | — | 1 | — |
| Rutile type titanium dioxide | | — | 2 | — | 2 | — | 2 | — | 0.5 | — | 1 |
| Property | | | | | | | | | | | |
| L* | | 92.9 | 89.9 | 93.7 | 92.7 | 79.3 | 77.3 | 94.2 | 92.0 | 87.9 | 85.0 |
| Tensile strength | (kgf/cm$^2$) | 1242 | 1178 | 1033 | 979 | 518 | 505 | 1254 | 1190 | 1018 | 967 |
| Tensile elongation | (%) | 1.9 | 1.8 | 2.4 | 2.3 | 5.1 | 4.8 | 2.6 | 2.5 | 2.4 | 2.4 |
| Appearance of molding product | | good | slightly stained | good | slightly stained | good | slightly stained | good | slightly stained | good | slightly stained |

EXAMPLES

The following measurement and evaluation techniques were employed in the Examples:

(1) L* Brightness Index

The L* brightness Index were conducted in accordance with standards JIS Z 8733-1982 (method for measuring an object's color) and JIS Z 8729-1980 (method of indicating the object's color by L*a*b* and L*u*u* color coordinate systems used to specify an index of whiteness).

(2) Tensile Test: Measured in accordance with ASTM D 638.

(3) Appearance of the Molded Product: The resin compositions were molded into flat plates using an injection molding machine and the appearance (tone) of the resulting molded plates was visually observed and subjectively evaluated as to its appearance,

Examples 1–5

Glass fibers or glass beads (component B), the anatase form of titanium dioxide (component C) were admixed with various types of thermoplastic base resins (component A) in the amounts shown in Table 1. The compositions were formed into pellets using a 40 mm single screw extruder. The pellets were thereafter injection molded into flat plate test pieces which were subjected to the evaluations described previously. The results are reported in the following Table 1.

As is evident from the data above, use of the anatase form of titanium dioxide not only improves the whiteness of the compositions according to this invention (as shown by the greater L* values), but also does not contribute to degradation of compositions' physical properties (as shown by the tensile strength and tensile elongation properties) as compared to comparable amounts of the rutile form of titanium dioxide. Moreover, each of the compositions which employed the rutile form of titanium dioxide exhibited slight staining which deleteriously affects surface appearance.

Thus, while the invention has been described in connection with what is presently considered to be the most practical and preferred embodiment, it is to be understood that the invention is not to be limited to the disclosed embodiment, but on the contrary, is intended to cover various modifications and equivalents included within the spirit and scope of the appended claims.

What is claimed is:

1. A glass-reinforced thermoplastic resin composition consisting essentially of, based on 100 parts by weight of the composition:

(A) between 35 to 95 parts by weight of a thermoplastic base resin which is selected from the group consisting of polybutylene terephthalate, polyacetal and polycarbonate, (B) between 5 to 65 parts by weight of a particulate glass filler material, and (C) a white-pigmenting effective amount between about 0.1 to 2 parts by weight of a white pigment which is the anatase form of titanium dioxide having a grain size of less than 0.1 to 0.5 μm.

2. A glass-reinforced thermoplastic resin composition as in claim 1, wherein the glass filler is at least one selected from the group consisting of glass fibers, glass flakes, glass beads, milled glass fibers and glass powders.

3. A glass-reinforced thermoplastic resin composition as in claim 1, wherein the anatase form of titanium dioxide has a lattice constant a of about 3.78 Å, a lattice constant c of about 9.49 Å, a specific gravity of about 3.9 and a hardness (old Mohs) of between about 5.5 to 6.0.

4. A glass-reinforced thermoplastic resin composition as in claim 1, which further includes a binding agent for said glass filler material.

5. A glass-reinforced thermoplastic resin composition as in claim 4, wherein said binding agent is selected from epoxy, isocyanate, silane and titanate compounds.

6. A glass-reinforced thermoplastic resin composition as in claim 5, wherein said binding agent is present in amounts up to 10% by weight of the glass filler material.

7. A glass-reinforced thermoplastic resin composition as in claim 1, which further comprises a non-white pigmenting agent.

* * * * *